March 11, 1941.　　　V. W. MASON　　　2,234,873
TRANSPLANTING DEVICE
Filed Jan. 7, 1938
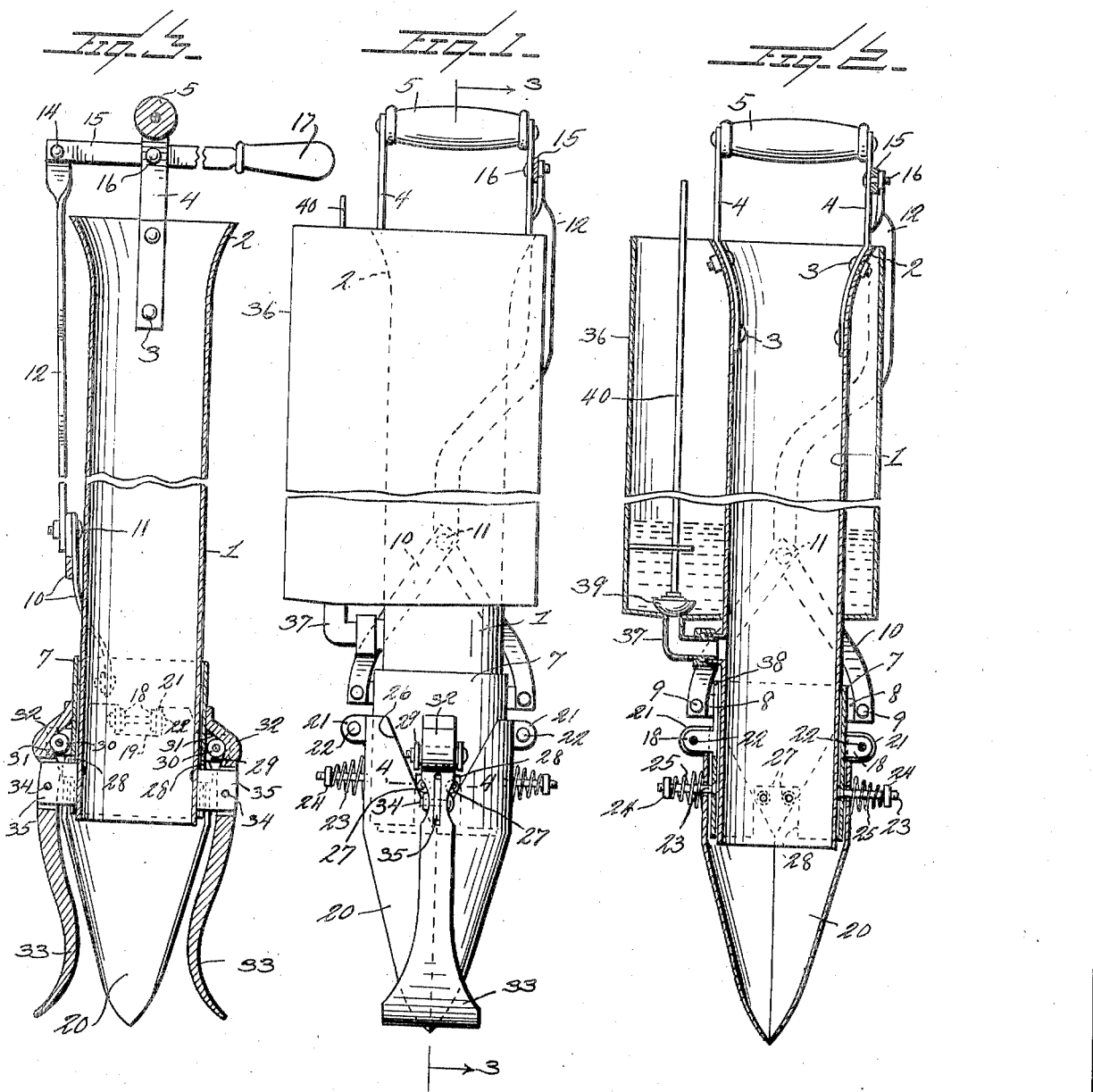
Inventor
V. W. Mason
By Watson E. Coleman
Attorney Patented Mar. 11, 1941

2,234,873

UNITED STATES PATENT OFFICE 2,234,873

TRANSPLANTING DEVICE

Vaden W. Mason, Brookneal, Va.

Application January 7, 1938, Serial No. 183,878

5 Claims. (Cl. 111—4)

This invention relates to transplanting devices and has relation more particularly to a device of this kind especially designed and adapted for use in the setting of tobacco or other plants in the ground.

It is an object of the invention to provide a device of this kind which is constructed and assembled in a manner to set tobacco plants or the like without the necessity of the operator undergoing any considerable fatigue.

Another object of the invention is to provide a device of this kind embodying means for effectively producing the desired hole for the plant together with means for holding the plant against deposit within the hole until after the formation of the hole has been completed, thus facilitating the desired covering of the roots of the plant after the device has been raised from within the hole.

The invention consists in the details of construction and in the combination and arrangement of the several parts of my improved transplanting device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein—

Figure 1 is a view in side elevation of a transplanting device constructed in accordance with an embodiment of my invention;

Figure 2 is a longitudinal sectional view taken through the device as illustrated in Figure 1 with certain of the parts in elevation;

Figure 3 is also a longitudinal sectional view taken through Figure 1 with certain of the parts in elevation, the line of section being on the line 3—3 of Figure 1, the reservoir being omitted;

Figure 4 is an enlarged detailed sectional view taken on the line 4—4 of Figure 1.

As disclosed in the accompanying drawing, 1 denotes an elongated tubular member or chute open at its opposite ends and which preferably has its upper end portion outwardly flared, as at 2. Suitably secured, as at 3, to this upper end portion of the member or chute 1 at diametrically opposed points are the outstanding arms 4 between which is supported a hand grasp 5.

The lower end portion of the member or chute 1 has slidably engaged therewith a surrounding sleeve 7. This sleeve 7 at diametrically opposed points and adjacent its upper or inner end portion is provided with the oppositely disposed lugs 8 having pivotally connected thereto, as at 9, the links 10. These links 10 are so formed as to extend around the adjacent portion of the member or chute 1 and are connected by a common pivot 11 with the lower end portion of a rod 12. This rod 12 is of a length to extend beyond the outer or upper end of the member or chute 1 and is pivotally connected, as at 14, to an end portion of a lever 15. This lever 15 at a predetermined point intermediate its ends is pivotally connected, as at 16, to one of the arms 4. The outer or free end portion of this lever 15 carries a hand grasp 17. It is believed to be obvious that upon proper manipulation of the lever 15 the sleeve 7 may be moved inwardly or outwardly with respect to the member or chute 1 and, as is illustrated in Figures 1 and 2, the rod 12 is formed to permit its proper or effective connection with the lever 15.

At substantially diametrically opposed points the sleeve 7 is provided with the outstanding ears 18. These ears 18 at each side are arranged in pairs and received within a cut-out portion 19 at the upper end of a shovel 20. This shovel at each side of the opening 19 is provided with an outstanding lug 21 lapping an ear 18. Disposed through the lugs 21 and ears 18 is a pintle 22 whereby the shovel 20 is supported for swinging movement.

The shovels 20 when at the limit of their inward movement have their edges in close contact and said shovels are so formed that when in their closed position they provide a tapered structure to facilitate their entrance into the ground.

The sleeve 7 below the ears 18 is also provided with the outstanding shanks 23 which are freely directed through the adjacent portions of the shovels 20. The outer end portions of these shanks 23 have threaded thereon the nuts or enlargements 24 and interposed between these nuts or enlargements 24 and the adjacent portions of the shovels 20 are the expansible members 25 herein disclosed as coil springs encircling the shanks 23. These expansible members or springs 25 operate to constantly urge the shovels 20 to their closed position and maintain said shovels in such position.

The upper opposed marginal portions of the shovels 20 diverge to provide trackways 26 which contact with the rollers 27 rotatably supported by the member or chute 1 so that as the sleeve 7 is moved upwardly the shovels 20 will be caused to swing outwardly and, of course, as the sleeve 7 is moved in the opposite direction the members or springs 25 will cause the shovels to return to their closed position. Each side of the sleeve 7 in its lower portion is provided with the enlarged recesses 28 to allow for the desired movement of the sleeve 7 without hinderance or obstruction being offered by the rollers 27.

The sleeve 7 within each of the spaces provided by the trackways 26 at the upper ends of the shovels 20 is provided with the outstanding spaced lugs 29 between which is rotatably mounted a roller 30. This roller 30 has contact with a cam face 31 provided at the inner side of a tail extension 32 disposed upwardly from the pivoted end portion of a holding or compressing arm 33. The cam face 31 is disposed lengthwise of the extension 32 and is substantially V-shaped in form with its apex outwardly disposed. This arm 33 is pivotally connected, as at 34, with an outstanding lug 35 carried by the lower portion of the member or chute 1. The cut-out portions or recesses 28 of the sleeve 7 also allow desired movement of the sleeve 7 without interference by the lugs 35.

As is believed to be well known, the soil in which tobacco plants or the like are set is initially very soft as by first pulverizing the soil and, therefore, my improved device will readily penetrate the soil to set the plant. In setting a plant the shovels 20 and arms 33 are in the adjustments as shown in the accompanying drawing and as is particularly illustrated in Figure 3 the lower ends of the arms 33 are at the limit of their outward position which is determined by the contact of the tail extension 32 with the sleeve 7. In this position of the arms 33 as illustrated in Figure 3 the rollers 30 are within the apex portions of the cam faces 31. As the sleeve 7 is drawn upwardly the shovels 20 are caused to open as hereinbefore mentioned, and during this opening the pulverized soil will have a tendency to drop in the hole being formed and particularly to surround the roots of the plant being set. As the shovels 20 open the contact of the rollers 30 with the upper portions of cam faces 31 will cause the arms 33 to move inwardly to press or pack the soil around the roots whereby the desired setting is materially facilitated. It may be added that these arms 33 operate to hold the plant in desired position for setting. After setting the plant the sleeve 7 is moved down a sufficient distance to allow the arms 33 to swing outwardly a limited distance while maintaining the shovels in partially open position and then withdrawing the planter upwardly.

The pressing action of the arms 33 is materially facilitated by having their lower or outer end portions materially wide, and said outer end portions of the arms 33 are outwardly curved or rounded so that there will be no tendency of these arms 33 to pick up the soil as the shovels 20 together with the arms 33 are lifted from the soil.

Carried by the upper portion of the member or chute 1 is a reservoir 36 of desired capacity and which has a delivery pipe 37 leading from its bottom wall and delivering within the lower portion of the chute or member 1. The upper portion of the sleeve 7 is cut away, as at 38, so that this connection 37 will not obstruct the desired movement of the sleeve 7 upwardly of the member or chute 1.

The flow of fluid within the reservoir 36, such as water or fertilizer fluid, is under control of a valve 39 carried by a stem 40. This stem 40 terminates in close proximity to the hand grasp 5 so that the same can be readily manipulated by the operator to open and close the valve as desired.

From the foregoing description it is thought to be obvious that a transplanting device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A plant setter comprising a chute to receive the plants to be set, a sleeve slidably surrounding the discharge end portion of the chute, opposed shovels carried by the sleeve and extending beyond the discharge end of the chute and having opening movement one with respect to the other, the upper opposed marginal portions of the shovels having upwardly diverging edges, means for normally maintaining the shovels in closed position, means for moving the sleeve along the chute, and means on the chute and engaging the diverging edges of the shovels for opening the shovels upon movement of the sleeve in one direction.

2. A plant setter comprising a chute to receive the plants to be set, a sleeve slidably surrounding the discharge end portion of the chute, opposed shovels carried by the sleeve and extending beyond the discharge end of the chute and having opening movement one with respect to the other, means for normally maintaining the shovels in closed position, means for moving the sleeve along the chute, said shovels having upper opposed marginal portions diverging to provide cam tracks, and members carried by the chute within the spaces between said tracks and contacting the tracks for opening the shovels upon movement of the sleeve in one direction.

3. A plant setter comprising a chute to receive the plants to be set, a sleeve slidably surrounding the discharge end portion of the chute, opposed shovels carried by the sleeve and extending beyond the discharge end of the chute and having opening movement one with respect to the other, outstanding shanks carried by the sleeve and freely disposed through the shovels, expansion means coacting with the shanks and the shovels for normally maintaining the shovels in closed position, means for moving the sleeve along the chute, and coacting means on the chute and shovels for opening the shovels upon movement of the sleeve in one direction.

4. A plant setter comprising a chute to receive the plants to be set, a sleeve slidably surrounding the discharge end portion of the chute, opposed shovels carried by the sleeve and extending beyond the discharge end of the chute and having opening movement one with respect to the other, means for normally maintaining the shovels in closed position, means for moving the sleeve along the chute, coacting means on the chute and shovels for opening the shovels upon movement of the sleeve in one direction, soil pressing arms pivotally engaged with the chute and extending beyond the discharge end of the chute, and coacting means carried by the sleeve and the arms for moving the arms inwardly between the shovels upon movement of the sleeve in a direction to open the shovels.

5. A plant setter comprising a chute to receive the plants to be set, a sleeve slidably surrounding the discharge end portion of the chute, opposed shovels carried by the sleeve and extending beyond the discharge end of the chute and having opening movement one with respect to the other, means for normally maintaining the shovels in closed position, means for moving the sleeve along the chute, coacting means on the chute and shovels for opening the shovels upon movement of the sleeve in one direction, soil pressing arms pivotally engaged with the chute and extending beyond the discharge end of the chute, said arms having cam faces, and parts carried by the sleeve engaging the cam faces for moving the arms inwardly between the shovels upon movement of the sleeve in a direction to open the shovels.

VADEN W. MASON.